United States Patent
Maletz et al.

(10) Patent No.: US 8,420,035 B2
(45) Date of Patent: Apr. 16, 2013

(54) COATING COMPOSITION FOR DIESEL OXIDATION CATALYSTS

(75) Inventors: Gerd Maletz, Bad Aibling (DE); Volker Kurth, Bonn (DE); Andreas Bentele, Bad Aibling (DE); Klaus Wanninger, Kolbermoor (DE); Arno Tissler, Tegernheim (DE)

(73) Assignee: Sued-Chemie IP GmbH & Co. KG, Munich (DE)

( * ) Notice: Subject to any disclaimer, the term of this patent is extended or adjusted under 35 U.S.C. 154(b) by 22 days.

(21) Appl. No.: 12/744,967

(22) PCT Filed: Nov. 27, 2008

(86) PCT No.: PCT/EP2008/010086
§ 371 (c)(1),
(2), (4) Date: Nov. 9, 2010

(87) PCT Pub. No.: WO2009/068289
PCT Pub. Date: Jun. 4, 2009

(65) Prior Publication Data
US 2011/0044871 A1 Feb. 24, 2011

(30) Foreign Application Priority Data
Nov. 28, 2007 (DE) .......................... 10 2007 057 305

(51) Int. Cl.
*B01D 53/94* (2006.01)
*B01J 23/38* (2006.01)
*B01J 23/54* (2006.01)
*B01J 29/00* (2006.01)
*B01J 37/00* (2006.01)
*C23C 20/06* (2006.01)

(52) U.S. Cl.
USPC ......... 423/213.2; 423/213.5; 502/60; 502/74; 502/325; 502/326; 106/1.25; 106/1.27; 106/266.3; 60/299

(58) Field of Classification Search ................. 106/1.25, 106/1.27, 286.3; 502/60, 74, 325, 326; 423/213.2, 423/213.5; 60/299
See application file for complete search history.

(56) References Cited

U.S. PATENT DOCUMENTS 5,354,720 A 10/1994 Leyrer et al.
5,928,981 A 7/1999 Leyrer et al.
(Continued)

FOREIGN PATENT DOCUMENTS

DE 10 2005 034 945 1/2007
EP 0 206 817 12/1986
(Continued)

OTHER PUBLICATIONS

World Intellectual Property Organization. "International Search Report." PCT/EP2008/010086. Applicant: Sud-Chemie AG. Mailed Jun. 12, 2009.

(Continued)

*Primary Examiner* — Timothy Vanoy
(74) *Attorney, Agent, or Firm* — Millen, White, Zelano & Branigan, P.C.

(57) ABSTRACT

The invention relates to a coating composition for diesel oxidation catalysts or a combination of diesel oxidation catalysts and diesel particle filters, said coating composition comprising a combination of a noble metal on a metal oxide, with the exception of cerium oxide, and a zeolite doped with iron. The invention also relates to a catalyst provided with the coating according to the invention, and to a method for treating the exhaust gas of diesel internal combustion engines.

20 Claims, 4 Drawing Sheets

U.S. PATENT DOCUMENTS

Figure 1:
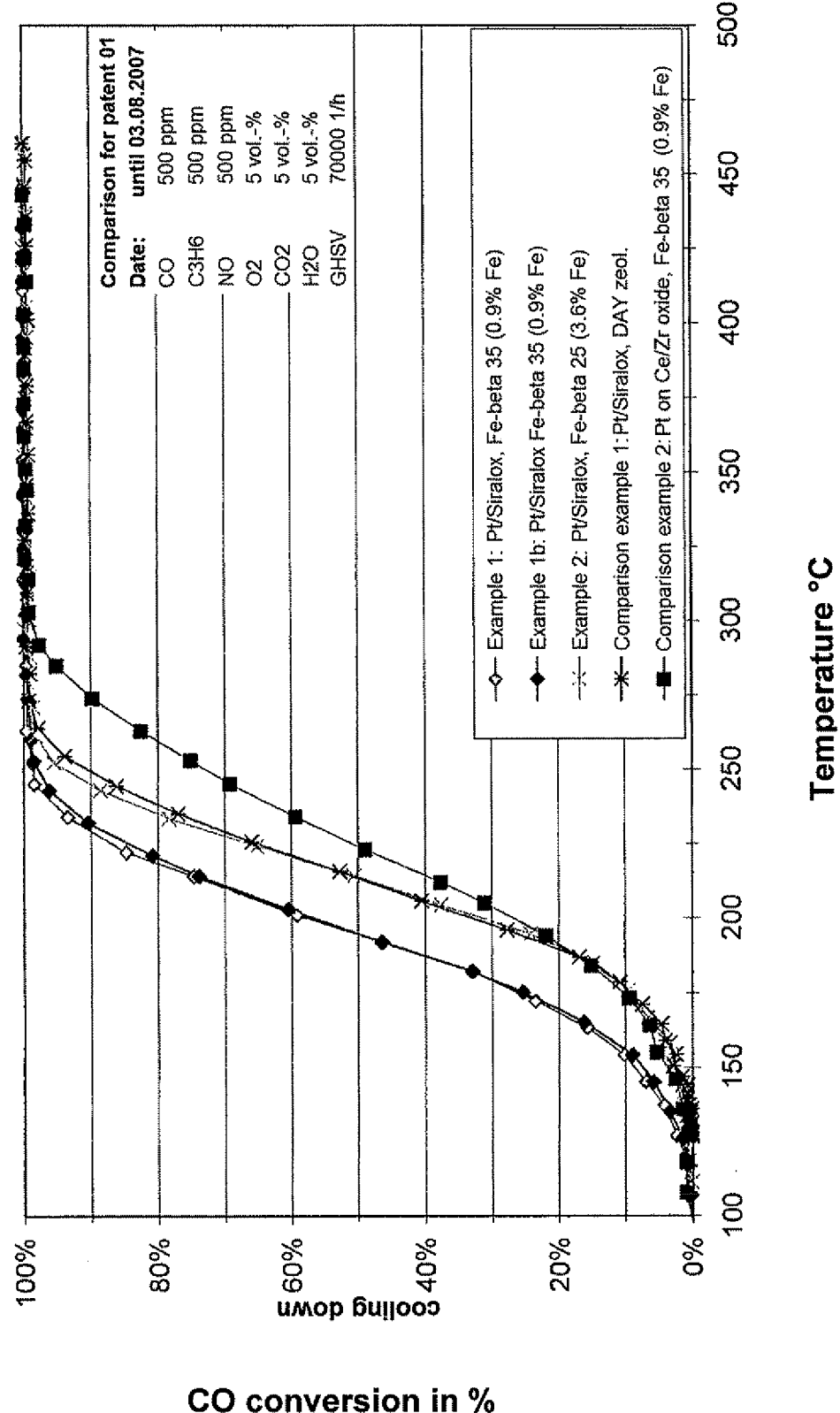

| | | |
|---|---|---|
| 6,274,107 B1 | 8/2001 | Yavuz et al. |
| 6,685,900 B2 | 2/2004 | Domesle et al. |
| 2006/0057046 A1 | 3/2006 | Punke et al. |
| 2007/0134145 A1* | 6/2007 | Strehlau et al. ............ 423/213.5 |
| 2008/0227627 A1 | 9/2008 | Strehlan et al. |

FOREIGN PATENT DOCUMENTS

| | | |
|---|---|---|
| EP | 0 341 832 | 11/1989 |
| EP | 0 559 021 | 9/1993 |
| EP | 0 614 398 | 9/1994 |
| EP | 0 614 399 | 9/1994 |
| EP | 0 691 883 | 1/1996 |
| EP | 0 800 856 | 10/1997 |
| EP | 0 830 201 | 3/1998 |
| EP | 1 129 764 | 9/2001 |
| EP | 1 165 946 | 1/2002 |
| EP | 1721665 A1 | 11/2006 |
| EP | 1810750 A1 | 7/2007 |
| EP | 1992409 A1 | 11/2008 |
| WO | WO-93 10885 | 6/1993 |
| WO | WO-93 10886 | 6/1993 |
| WO | WO-94 22564 | 10/1994 |
| WO | WO-96 39244 | 12/1996 |
| WO | WO-00 29726 | 5/2000 |
| WO | WO-03 022430 | 3/2003 |
| WO | 2008106523 A | 9/2008 |

OTHER PUBLICATIONS

Balle, P. et al. "A novel laboratory bench for practical evaluation of catalysts useful for simultaneous conversion of $No_x$ and soot in diesel exhaust" Chemical Engineering and Processing 45:1065-1073 (2006).

Kögel, M. et al., "Simultaneous catalytic removal of NO and $N_2O$ using Fe-MFI," Journal of Catalysis, 1999, vol. 182, No. 2, pp. 470-478.

Leyrer, J. et al., "Advanced studies on diesel aftertreatment catalysts for passenger cars," SAE Technical Paper Series, 1996, p. 1-25.

Sued Chemie AG, "Uniform impregnation of loose goods with impregnating fluid has goods impregnated in gap which is formed by rollers which are coated with elastic material which can receive fluid and deliver it again," Espacenet, Publication Date: Jan. 25, 2007; English Abstract of DE-10 2005 034 945.

Verdier, S. et al., "Innovative materials for diesel oxidation catalysts, with high durability and early light off," SAE Technical Paper Series, 2005.

* cited by examiner

NO$_2$ yield in %

COATING COMPOSITION FOR DIESEL OXIDATION CATALYSTS

The invention relates to a coating composition for use in diesel oxidation catalysts, in particular in a combination of a diesel oxidation catalyst and a diesel particle filter, a catalyst comprising the coating composition as well as a method for treating the exhaust gas of diesel internal combustion engines.

When the exhaust gases of internal combustion engines were first treated, only the exhaust gases of gasoline and spark ignition engines were purified with three-way catalysts (TWC). The nitrogen oxides (NOx) present in the exhaust gas are reduced with the hydrocarbons (HC) and carbon monoxide (CO) also contained in the exhaust gas. In order to achieve an optimum catalyst action, the gasoline engine is operated under approximately stoichiometric conditions, i.e. $\lambda=1$. This condition of $\lambda=1$ in the exhaust-gas stream cannot always be precisely maintained, with the result that the catalyst is exposed alternately to an oxidative and a reductive gas atmosphere.

For some time, attempts have also been made to treat the exhaust gases of diesel internal combustion engines with catalysts. This requires conceptional modifications to the catalyst materials, as a diesel engine, unlike a gasoline engine, is always run with an excess of oxygen and the catalyst is thus never exposed to reductive conditions. The exhaust gas of diesel engines contains carbon monoxide, unburned hydrocarbons, nitrogen oxides and soot particles as air pollutants. The unburned hydrocarbons include paraffins, olefins, aldehydes and aromatics.

Compared with the exhaust gases of gasoline engines, diesel exhaust gases have a substantially higher proportion of poorly oxidizable, long-chained paraffins. Moreover, diesel exhaust gases are much colder than exhaust gases of gasoline engines and contain oxygen in a concentration between 3 and 10 vol.-%. In partial-load operation, the exhaust-gas temperature of a diesel engine lies in the range between 100 and 250° C. and reaches a maximum temperature between 550 and 650° C. only in full-load operation. In contrast, the exhaust-gas temperature of a gasoline engine in partial-load operation lies between 400 and 450° C. and can rise to 1000° C. at full-load.

With catalysts for diesel engines, unlike TWC the ability of the catalyst to store oxygen consequently plays a secondary role. Accordingly, because of the constant excess of oxygen, noble metal particles cannot be reduced to metal with the oxidation state 0, nor can the nitrogen oxides be reduced by the hydrocarbons (HC) present in the exhaust gas on account of the excess of oxygen in the exhaust gas of diesel engines. Further, the hydrocarbons and the CO can be oxidized both with atmospheric oxygen and with NOx.

A further problem with diesel engines is, as already mentioned above, that the exhaust-gas temperature is on average lower than in gasoline engines and the catalytic activity of the catalyst is consequently on average not always sufficient to oxidize HC and CO. In order to achieve a sufficient catalytic activity, the CO light-off temperature must thus be lower.

The light-off temperature denotes the starting temperature of the catalyst, i.e. the temperature at which 50% conversion is measured. With HC, unlike CO, the lowering of the light-off temperature is more difficult to achieve, as in particular saturated and aromatic hydrocarbons are more poorly oxidizable. In order to circumvent this problem, it was attempted in the state of the art to add to the catalysts zeolites which adsorb the hydrocarbons when running cold and release them later when running hot, where the catalytic activity is sufficient to oxidize the hydrocarbons.

An example of a HC storage with zeolites is described in SAE Technical Paper Series, "Advanced Studies on Diesel Aftertreatment Catalysts for Passenger Cars", 1996.

EP 0 830 201 B2 discloses a method for reducing nitrogen oxides and in particular an adsorption of HC on a non-metallized zeolite at a temperature of up to 190° C. and a desorption at temperatures of 190-250° C. The reduction of nitrogen oxides can be improved by this method.

In TWC, cerium oxide or Ce/Zr mixed oxides are normally used as oxygen storage materials. Further possible metal oxides are for example $LaO$, $ZnO$, $ZrO_2$, $SnO_2$, $YO_2$, $TiO_2$ or $MnO_2$. As diesel engines, as described above, are always run with an excess of oxygen, the use of oxygen storage materials is not necessary with diesel oxidation catalysts. Further, noble metals on cerium oxide or cerium-containing mixed oxides are characterized by a high metal-support interaction. High noble metal dispersions, preferably in high oxidation states, can therefore be stabilized on cerium oxide or cerium-containing mixed oxides. In TWC, the noble metal is repeatedly reduced by the constant change to reductive conditions. This is not possible with diesel oxidation catalysts, which means that the noble metal in the diesel oxidation catalyst reacts sufficiently with CO only at higher temperatures. A higher light-off temperature for CO and propene therefore results when noble metals on cerium-containing oxides are used. This behaviour can also clearly be seen in the publication SAE 2005-01-0476 and in particular in FIGS. 3 to 6 there. On the other hand, at a high temperature, the Pt dispersion is utilized very well and therefore allows lower noble metal concentrations on the catalysts.

Platinum on zirconium oxide or aluminium oxide or Al/Si mixed oxides have a higher platinum concentration of the oxidation state 0 and thereby a lower light-off temperature for CO and HC. However, the effectiveness of the platinum is reduced by the relatively large platinum particles and thereby smaller platinum surface. A mixture of "bulk ceria" and "bulk alumina" or other oxides is therefore proposed in EP 0 614 398 B1 and EP 0 614 399 B1.

The use of iron-doped zeolites in diesel oxidation catalysts in combination with cerium oxide is described in EP 0 691 883 B1 and U.S. Pat. No. 6,274,107. However, this combination has the abovenamed disadvantage of a higher light-off temperature for CO.

A way of reducing the light-off temperature for CO is shown in EP 0 706 817 B1. In this, diesel oxidation catalyst with platinum on an Al/Si mixed oxide (with approximately 5% Si) is described.

The further development is described in EP 0 800 856 B1, wherein light-off temperatures of approximately 150° C. are already achieved for CO using a H+ and Na+ zeolite.

A further improvement is disclosed in EP 1 129 764 B1, wherein very finely dispersed Pt particles with an average oxidation state <2.5 form as a result of a calcining by means of injection into a flame.

Following the introduction of diesel oxidation catalysts, which reduce only CO and hydrocarbons and reduce nitrogen oxides only to a small extent in a narrow temperature range, in recent years the reduction of particle emissions has proved to be an important task for the automotive industry. To this end, diesel particle filters (DPF) are also arranged behind the DOC. Such systems are described for example in EP 1 165 946 B1 and EP 0 341 832 B1. Today, the diesel particle filter is installed further back in the vehicle due to space constraints and for temperature management reasons and is usually separated from the DOC.

For the next catalyst generation, a further catalytic step, selective catalytic reduction (SCR) of nitrogen oxides with urea, is currently being introduced in order to reduce nitrogen oxides. Due to space constraints and in order to reduce costs, combining the DOC function and DPF is therefore an important aim in future. This aim is described in the publication SAE 2006-01-1091 and a possible direction for it is also contemplated in US 2006/0057046 A1.

If it is wished to combine the two catalytic functions of the DOC and DPF in one component, the DOC must be able to withstand substantially higher temperatures. The reason for this is that the diesel particle filters must be repeatedly actively regenerated by increasing the temperature. Usually, when a vehicle is run, temperature ranges are repeatedly passed through at which the temperature is not sufficient to postoxidize the soot particles. They then collect on the particle filter, which is why the latter must be regenerated at regular intervals by active soot burn-off. In adverse conditions (many cold-start phases=much accumulated soot), the DPF becomes very hot. Consequently, if DOC and DPF are combined in one component the catalyst must be able to withstand much higher temperatures.

The object of the present invention was thus to provide a coating composition for diesel oxidation catalysts or a combination of diesel oxidation catalysts and diesel particle filters, in which the light-off temperature for CO and HC is reduced and which has an increased temperature stability.

This object is achieved by a coating composition for diesel oxidation catalysts or a combination of diesel oxidation catalysts and diesel particle filters, which comprises a combination of a noble metal on a metal oxide, with the exception of cerium oxide, and a zeolite doped with iron. The iron contents relative to the (overall) weight of zeolite range from 0.2 to 10 wt.-%.

The scope of the invention also includes a catalyst which contains the coating composition according to the invention.

The scope of the invention also includes a method for treating the exhaust gas of diesel internal combustion engines, wherein the treatment of the exhaust gas comprises the oxidation of CO and HC, the reduction of NOx and the elimination or reduction of particle emissions by oxidation in a diesel oxidation catalyst or a combined diesel oxidation catalyst and diesel particle filter.

The catalyst according to the invention combines the functions of an oxidation catalyst and diesel particle filter in one component. In addition, a reduction in the $NO_x$ concentration in the exhaust gas can also be achieved, as there is also a shift in the $NO_x$ equilibrium to $NO_2$ as a result of the catalyst coating according to the invention and this $NO_2$ contributes to the oxidation of the soot particles. The oxidation of the soot particles takes place more readily with the $NO_2$ than oxidation by excess oxygen contained in the exhaust-gas stream, with the result that $NO_2$ preferably reacts and is thereby itself reduced.

The zeolite is preferably selected from ZSM-5 (MFI), Y (FAU), BETA (BEA) and mordenite (MOR). Combinations of the named zeolites can also be used. The zeolite used preferably has a ring opening formed from 8, 10 or 12 tetrahedral atoms, with a high silicon dioxide content. The zeolite used should have an Si/Al molar ratio of >5:1 to at most 300:1. Typical, but not limitative, values for the Si/Al ratio are approximately 5:1 to 80:1 for zeolite Y, approximately 25:1 to 300:1 for the beta zeolite and 10:1 to 300:1 for ZSM-5.

A beta zeolite with an $SiO_2/Al_2O_3$ ratio of from 20:1 to 150:1 and 0.5 to 1.5% iron content is particularly preferably used.

Mixtures of the iron-containing zeolites can also be used. A mixture of an iron beta zeolite and an iron ZSM-5 is particularly preferably used, as the ZSM-5 has a particularly high interaction with small aromatics.

Although it adsorbs fewer of the longer-chained hydrocarbons, which account for a high proportion of the diesel exhaust gas, it desorbs the small aromatics only at a high temperature, with the result that the desorption is then spread over a longer period. This is advantageous when there are load variations in the cold-start range.

As already stated above, according to the invention the zeolite is doped with iron. Iron-doped zeolites have a very high thermal and hydrothermal stability and are therefore particularly suitable for use in combined DOC and DPF. The production of the zeolites doped with iron can be carried out by customary methods such as liquid-phase exchange or solid-state ion exchange. These methods are known in the state of the art.

The zeolite preferably has an iron content of 0.5-10 wt.-%, further preferably 0.5-5.9 wt.-% and particularly preferably 0.6-2.0 wt.-%, relative to the weight of the zeolite, in order to achieve an optimum adsorption ability and optimized hydrothermal stability over a longer period. Excellent results were able to be achieved in particular with an iron content of 0.9 wt.-%, relative to the weight of the zeolite.

The iron is preferably introduced into the zeolite by means of a solid-state reaction between an iron salt such as $FeSO_4 \cdot y\ H_2O$, $Fe(NO_3)_2$, $FeCl_2 \cdot yH_2O$, wherein y is a number from 0-12 (doping). It is to be borne in mind during the synthesis that in the solid-state ion exchange reaction an intimate mechanical mixing of the $(NH^+_4)$ and/or the $H^+$ form of the zeolite with an iron salt is initially required by intensive mechanical mixing, e.g. in a ball mill at room temperature. This mixture is then usually calcined in an oven in air or under nitrogen or a reductive atmosphere, then optionally washed and dried after being filtered out.

The principal task of the zeolite mixture in the catalyst is to temporarily store the hydrocarbons of the exhaust gas at low exhaust-gas temperatures, in order to release them again in operating states of the diesel engine where exhaust-gas temperatures are higher. At these higher exhaust-gas temperatures, the desorbed hydrocarbons can in part be oxidized by the catalytically activated additional metal oxides to carbon monoxide and water. The non-oxidized proportions of the hydrocarbons serve, alongside carbon monoxide, as reducing agents for the catalytic reduction of the nitrogen oxides contained in the exhaust gas.

The iron-doped zeolites display an increased desorption temperature for hydrocarbons in $NH_3$ desorption experiments. A hydrocarbon storage over a broader temperature range is thereby made possible, which makes possible in particular an improvement in the cold-start properties when used in diesel oxidation catalysts.

Preferred noble metals which are deposited on the metal oxide are platinum, palladium and optionally ruthenium, wherein platinum is particularly preferred. Combinations of the named noble metals are also possible, wherein a combination of platinum and iridium, as is disclosed in EP 559 021 A2, is not desired, as this results in a reduction of the nitrogen oxides. Within the meaning of this invention, however, it is those same nitrogen oxides that are to participate in the oxidation of the soot particles in the particle filter, with the result that a prior reduction of the nitrogen oxides would eliminate this advantage of the invention. However, such a combination is conceivable as a downstream system, for example an SCR system, wherein any remaining NOx still present in the exhaust-gas stream can then be reduced.

The noble metal is deposited on the metal oxide support by methods known in the state of the art. These include for example impregnation in a dipping bath (washcoat), spray impregnation or an impregnation by means of foam rollers as described in DE 102005035945 A1.

The noble metal is customarily present as salt solution, for example as chloride, nitrate or sulphate for the impregnation. All common salts and complex salts of noble metals, e.g. hexachloroplatinic acid, tetrachloroplatinic acid, dinitro diamine platinate (II), tetraamine platinum (II) chloride, ammonium tetrachloroplatinate (II), ammonium hexachloroplatinate (IV), dichloro(ethylenediamine) platinum, tetraamine platinum (II) nitrate, tetraamine platinum (II) hydroxide, methylethanolamine platinum (II) hydroxide, platinum nitrate, palladium nitrate, dinitro diamine palladium (II), tetraamine palladium (II) hydroxide, ethanolammonium hexahydroxoplatinate (PtEA) and similar are usually suitable.

After impregnation, the metal oxide supports impregnated with noble metal salt are calcined, preferably at temperatures of from 200 to 600° C., as a result of which finely dispersed noble metal is deposited on the metal oxide support. The particle size of the deposited noble metal is preferably to be found in the range of from 1 to 20 nm, particularly preferably in the range of from 3 to 17 nm. The particle size can be determined by transmission electron microscopy (TEM). The noble metal concentration on the metal oxide support after calcining is approximately 1-10 wt.-%, preferably 2-5 wt.-% relative to the overall weight of the impregnated metal oxide. As disclosed in EP 1 129 764 B1, a calcining by means of injection into a flame can also be carried out, whereby very finely dispersed Pt particles with an average oxidation state <2.5 form.

The metal oxides used should be suitable as supports for the noble metal and have a BET surface area of 50-250 $m^2/g$, preferably 100-200 $m^2/g$. The BET surface area is determined according to DIN 66132 (using the Brunauer, Emmett and Teller method).

The metal oxide is preferably selected from aluminium oxide, Al/Si mixed oxide, titanium oxide and zirconium oxide, but at any rate without cerium-containing oxides, as this would increase the light-off temperature for CO and HC. In the case of the Al/Si mixed oxide, the molar ratio of Al/Si is to be approximately 95:5 to 80:20.

The activated metal oxides are used together with the Fe zeolite and to this end deposited on a suitable support. To this end, a so-called washcoat (usually aqueous suspensions, i.e. a suspension containing the coating composition according to the invention, the impregnated metal oxide and the Fe zeolite) is generally produced and deposited on the support using methods known in the state of the art. Monolithic supports of for example metal or ceramic are in particular suitable as supports.

The optimum weight ratio of the metal oxides to the zeolite mixture depends on the average hydrocarbon concentration in the exhaust gas and is thus also dependent on the type of diesel engine. Above a weight ratio of 10:1, however, sufficient storage of the hydrocarbons can no longer be in any way guaranteed. On the other hand, if the weight ratio of metal oxides/zeolite mixture is less than 1:3, the catalytic activity of the catalyst is no longer adequate. For direct-injection and indirect-injection diesel engines, weight ratios of 6:1 to 1:1, preferably 5:1 to 2:1, have proved successful.

The coating composition can also be processed in known manner into shaped bodies such as tablets and extrudates with the addition of further suitable additives such as inorganic binders (e.g. silica sol), pore formers, plasticizers and moisteners. However, the catalyst containing the coating composition according to the invention is preferably deposited in the form of a coating (as washcoat) on the inner walls of the flow channels of metallic or ceramic honeycomb bodies (monoliths).

Coating quantities of from 50 to 500 g/l volume of the honeycomb body are advantageous for the exhaust gas purification of diesel engines. The component of the coating composition (which acts as an actual catalyst after deposition and calcining) is preferably adjusted such that the catalytically active components are present in the additional metal oxides in a concentration of approximately 0.01 to 7 g/l volume of the honeycomb body.

The required coating techniques are known to a person skilled in the art. Thus for example the coating composition of activated metal oxides and the zeolite mixture is processed to an aqueous coating dispersion. Silica sol for example can be added to this dispersion as binder. The viscosity of the dispersion can be adjusted by suitable additives, with the result that it becomes possible to deposit the required coating quantity onto the walls of the flow channels in a single step. If this is not possible, the coating can be repeated several times, wherein the freshly deposited coating is fixed each time by intermediate drying. The finished coating is then dried at an increased temperature and calcined at temperatures of between 300 and 600° C. for 1 to 4 hours.

The scope of the invention also includes a catalyst for treating the exhaust gas of diesel internal combustion engines which contains the coating composition according to the invention. The catalyst is preferably to act as a diesel oxidation catalyst and a diesel particle filter. By combining the two functions in one component, space can be saved on the one hand and in addition production costs can be reduced on the other.

The catalyst according to the invention or the coating composition according to the invention can be used for treating the exhaust gas, in particular for purifying exhaust gases of diesel internal combustion engines. The advantage of such a catalyst according to the invention is the reduced CO and HC light-off temperature, as can be seen in FIG. 1 compared with the conversions under laboratory conditions with 500 ppm CO, 500 ppm propene and 500 ppm NO.

The scope of the present invention also includes a method for treating the exhaust gas of diesel internal combustion engines, wherein the treatment of the exhaust gas comprises the oxidation of CO and HC, the reduction of NOx and the elimination or reduction of particle emissions by oxidation in a diesel oxidation catalyst or a combined diesel oxidation catalyst and diesel particle filter. To this end, the exhaust-gas stream produced from a diesel internal combustion engine is passed over the diesel oxidation catalyst or the combined diesel oxidation catalyst and diesel particle filter which contains the coating composition according to the invention.

Figure 2:
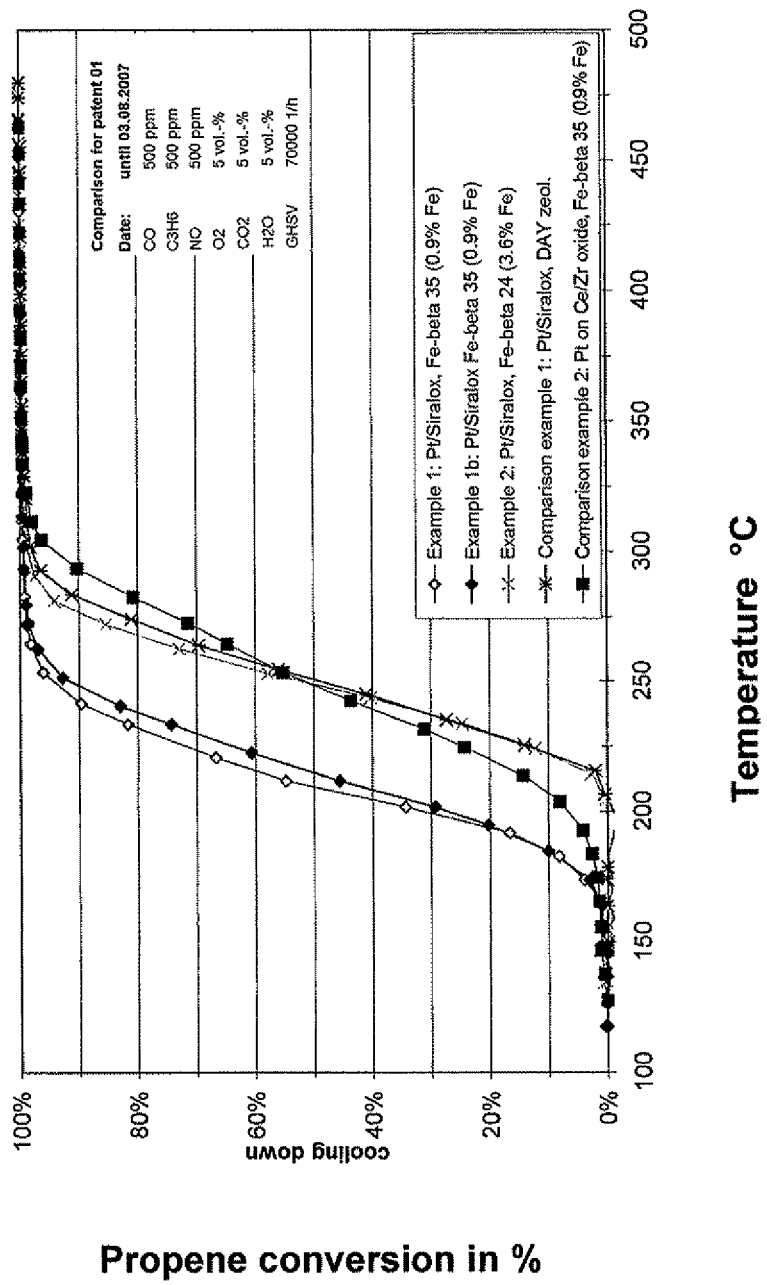
Figure 3:
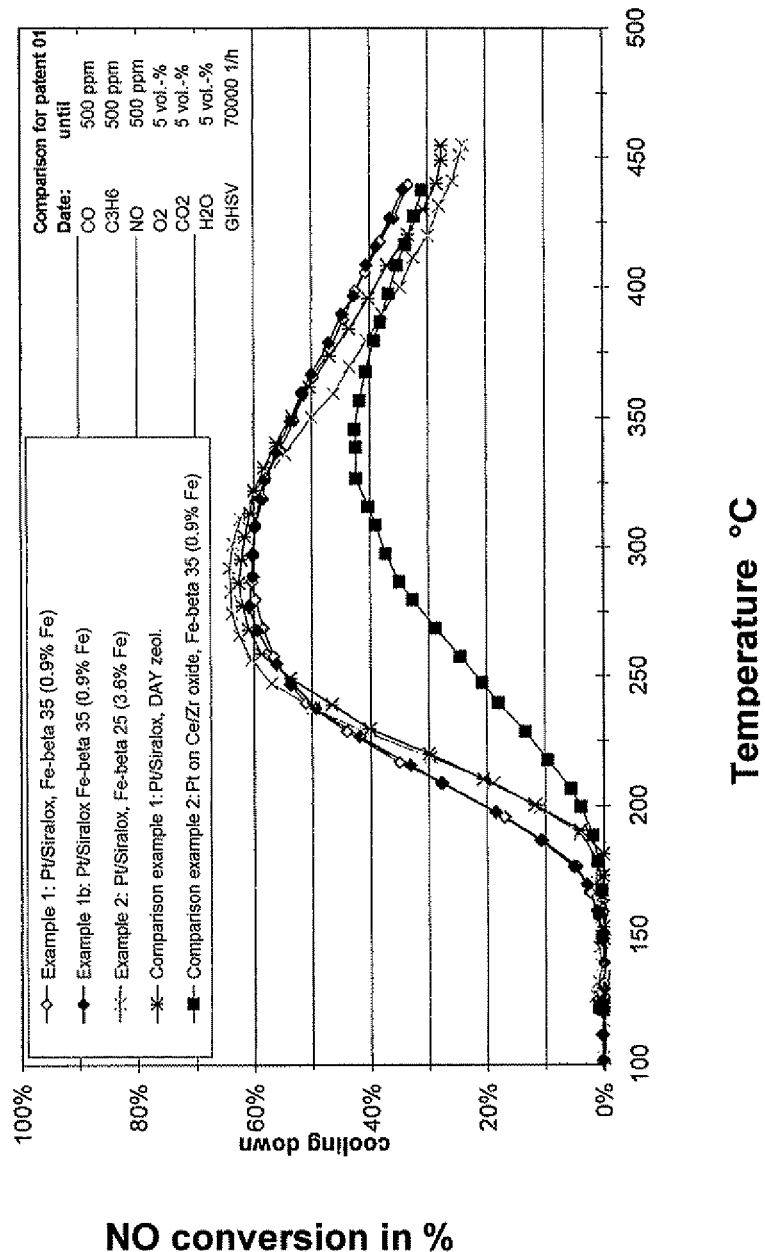
Figure 4:
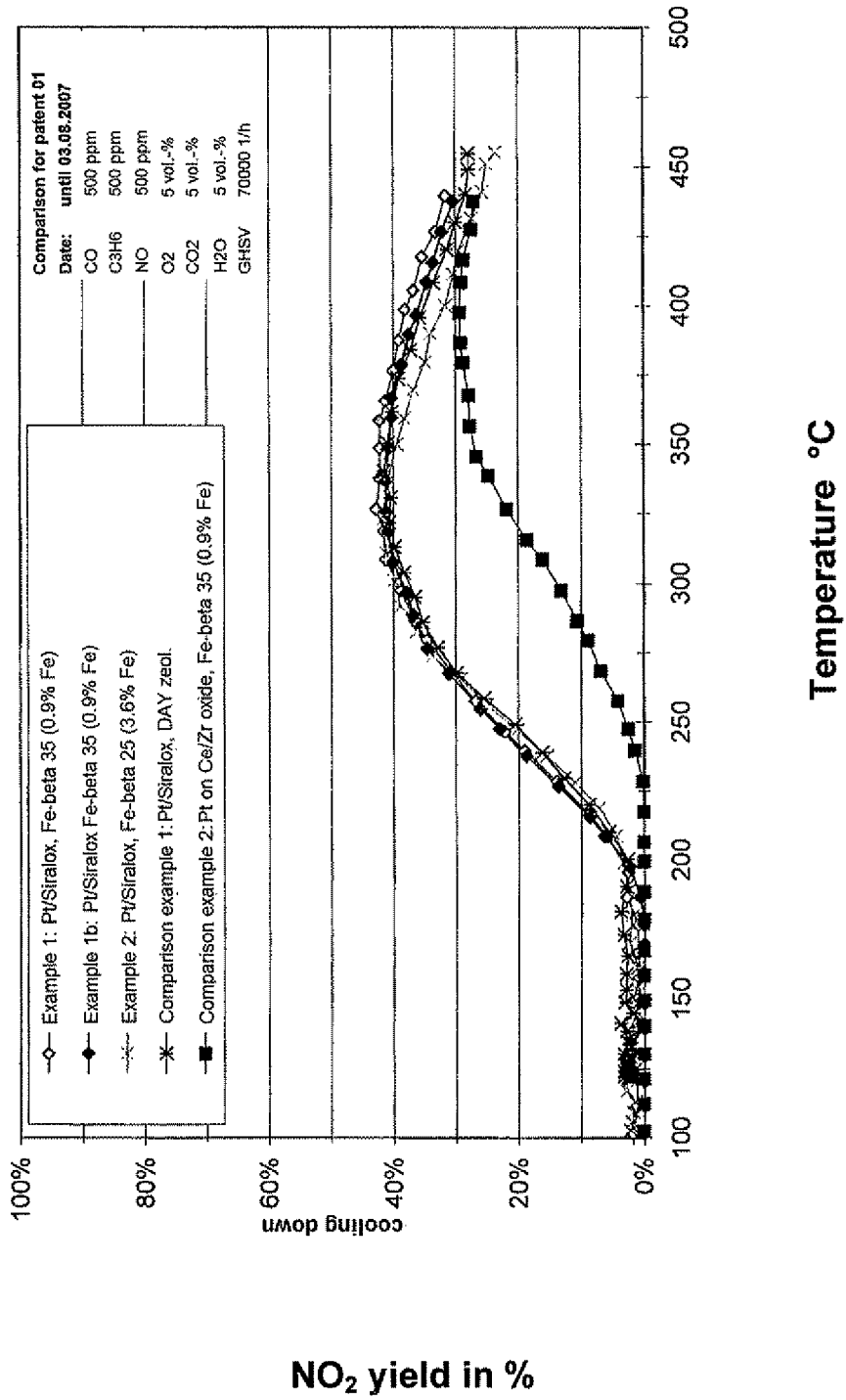

The invention will now be described in more detail with reference to some examples and figures not to be considered limiting. There are shown in:

FIG. 1 the conversion rates of CO with catalysts according to the invention and comparison catalysts, FIG. 2 the conversion rates of propene with catalysts according to the invention and comparison catalysts, FIG. 3 the conversion rates of NO with catalysts according to the invention and comparison catalysts, FIG. 4 the yield of NO$_2$ with catalysts according to the invention and comparison catalysts.

EMBODIMENT EXAMPLES

1. Production of the Iron-Containing Zeolites:

Example 1

Pt/Siralox with Fe-beta Zeolite (0.9% Fe)

1. Production of an Iron-Exchanged ("doped") β-Zeolite:

Firstly, an ion-exchanged zeolite was produced as described in WO 03/022430 p. 21 by "liquid ion exchange" in a suspension of an NH$_4$-Beta-35 zeolite (SiO$_2$/Al$_2$O$_3$=35, relative to Si/Al) with iron sulphate.

2. Production of the Oxidation Catalyst:

Firstly, the water absorption of an Al/Si mixed oxide (Siralox 5/155 from Condea) was determined by weighing the powder dry. 357.4 g of the dry powder was then impregnated in a planetary-type mixer with a solution of ethanolammonium hexahydroxoplatinate (PtEA). To this end, 128.8 g of a PtEA solution with 13.87% Pt (manufacturer: Heraeus) was diluted to the point where the overall volume corresponds to 90% of the ascertained possible water absorption. After this impregnation, which is carried out by adding the Pt solution dropwise in the mixer, the powder was dried for 3 h at 80° C. and then calcined for 3 h at 550° C. The concentration of the platinum on the powder was 5% at the end.

A washcoat was then produced from these two powders: 140 g of the powder 5% Pt/Siralox was dispersed in 560 g water. The suspension was ground in a 300-ml container by means of a bead mill (Dyno-Mill, WA-Bachofen) with Ce-stabilized ZrO$_2$ balls (1.2 mm) for 20 min at 4000 rpm. 60 g of the Fe zeolite was then added to 300 g of this suspension and water added again, with the result that the solids concentration was again 20%. This suspension was homogenized for a further 4 min with an "Ultra-Turrax stirrer" at 6000/min. Using this washcoat, 400 cpsi cordierite monoliths were coated with 120 g washcoat/l honeycomb.

The honeycombs were dried at 120° C. and calcined at 550° C.

For the toluene adsorption tests, 30 g of this washcoat was dried in a dish and calcined at 550° C. One part of the resultant powder was aged for 16 h at 700° C. and one part at 1000° C. in the oven.

Example 1b

Is identical to Example 1a, the only difference being that the grinding was not carried out continuously with a bead mill, but batchwise with a planetary-type ball mill, as in comparison example 2.

140 g of the powder with 5% Pt on Siralox with 210 g water was ground in a 500-ml container in a Retsch planetary-type ball mill with Y-stabilized ZrO$_2$ balls for 5 h at 250 rpm. This suspension was diluted with 350 g water to a solids content of 20%. This grinding process produced a suspension with comparable d$_{50}$ values, but somewhat fewer particles less than 0.5 µm than in Example 1.

Example 2

Pt/Siralox with Fe-beta Zeolite (3.6% Fe)

1. Production of an Iron-Exchanged β-Zeolite:

Firstly, an ion-exchanged zeolite with 3.6% iron content was produced by "solid-state ion exchange" in a solids mixture of H-beta-25 zeolite (SiO$_2$/Al$_2$O$_3$=25, relative to Si/Al) with iron chloride, as described in M. Kögel et. al. J. Catal. 182, (1999), 470-478 (an MFI zeolite, and not a H-beta-25 zeolite, is used in this citation).

2. Production of the Oxidation Catalyst:

The 5%/Pt on Siralox powder from Example 1 was used again. A washcoat was then produced from these two powders: 140 g of the powder with 5% Pt/Siralox was dispersed in 560 g water. The suspension was ground in a 300-ml container by means of a bead mill (Dyno-Mill, WA-Bachofen) with Ce-stabilized ZrO$_2$ balls (1.2 mm) for 20 min at 4000 rpm. 60 g of the Fe zeolite was then added to 300 g of this suspension and water added again, with the result that the solids concentration was again 20%. This suspension was homogenized for a further 4 min with an "Ultra-Turrax stirrer" at 6000/min. Using this washcoat, 400 cpsi cordierite monoliths were coated with 120 g washcoat/l honeycomb. The honeycombs were dried at 120° C. and calcined at 550° C.

Comparison Example 1

Pt/Siralox with Dealuminized Y-Zeolite

Production of the Oxidation Catalyst:

The 5%/Pt on Siralox powder from Example 1 was used again.

A dealuminized Y-zeolite customary in the trade (CBV-500 from Zeolyst) (non-ion exchanged, thus a H-zeolite as in EP 800856 B1) was used as zeolite.

A washcoat was then produced from these two powders:

140 g of the powder with 5% Pt/Siralox was dispersed in 560 g water. The suspension was ground in a 300-ml container of a bead mill (Dyno-Mill, WA-Bachofen) with Ce-stabilized ZrO$_2$ balls (1.2 mm) at 4000 rpm. 60 g of the DA-Y zeolite was then added to 300 g of this suspension and water added again, with the result that the solids concentration was again 20%. This suspension was homogenized for a further 4 min with an "Ultra-Turrax stirrer" at 6000/min.

Using this washcoat, 400 cpsi cordierite monoliths were coated with 120 g washcoat/l honeycomb. The honeycombs were dried at 120° C. and calcined at 550° C.

For the toluene adsorption tests, 30 g of this washcoat was dried in a dish and calcined at 550° C. One part of the resultant powder was aged for 16 h at 700° C. and another part at 1000° C. in the oven.

Comparison Example 2

Pt on Ce/Zr Oxide with Fe-Beta Zeolite (0.9% Fe)

1. Production of an Iron-Exchanged µ-Zeolite:
The same Fe-beta zeolite was used as in Example 1.

2. Production of the Oxidation Catalyst:

Firstly, the water absorption of a Ce/Zr mixed oxide (Ce/Zr=75/25 from AMR no. 21289) was determined by weighing the powder dry, followed by suspension in water and filtering off, and the moist filter cake weighed.

200 g of the dry powder was then impregnated in a planetary-type mixer with a solution of ethanolammonium hexahydroxoplatinate (PtEA). To this end, 72.1 g of a PtEA solution with 13.87% Pt was diluted until the overall volume corresponded to 70% of the ascertained possible water absorption. After this impregnation by adding the Pt solution dropwise in the mixer, the powder was briefly placed in a drying oven at 120° C. and then dried for 3 h at 80° C. in the oven and then calcined at 550° C.

The concentration of the platinum on the Ce/Zr powder was 5 wt.-% at the end, relative to the overall weight of Pt/Ce/Zr powder.

A washcoat was then produced from these two powders:

140 g of the powder with 5% Pt on Ce/Zr oxide with 210 g water was ground in a 500-ml container in a Retsch planetary-type ball mill by means of Y-stabilized $ZrO_2$ balls for 5 h at 250 rpm. This suspension was diluted with 350 g water to a solids content of 20%. 60 g of the Fe zeolite was then added to 300 g of this suspension and water added again, with the result that the solids concentration was again 20%. This suspension was homogenized for a further 4 min with an "Ultra-Turrax stirrer" at 6000/min.

Using this washcoat, 400 cpsi cordierite monoliths were coated with 120 g washcoat/l honeycomb. The honeycombs were dried at 120° C. and calcined at 550° C.

Example 3

Gas Reaction Activities

The oxidation activity of the catalysts was tested with a model exhaust gas in a tubular reactor. The gas composition is given in Table 1:

TABLE 1

Gas composition of the activity test

| Gas | Proportion |
|---|---|
| CO | 500 ppm |
| Propene | 500 ppm |
| NO | 500 ppm |
| $O_2$ | 5% |
| $CO_2$ | 5% |
| $H_2O$ | 5% |
| $N_2$ | remainder |

Small ceramic honeycombs 5 cm in length and 2.5 mm in diameter with a space velocity of 70.000 $h^{-1}$ were tested at a heating rate of 10° C./min.

It was to be borne in mind that the very high propene concentration generally reduces the CO conversion, with the result that the CO light-off temperatures were much higher than under real diesel exhaust gas conditions, as real diesel exhaust gas as a rule contains fewer olefins, customarily fewer than 500 ppm.

FIGS. 1 to 4 show the conversion rates of CO, propene and NO as well as the $NO_2$ yield when using catalysts according to the invention or comparison catalysts. The respective gas mixture was heated to 470° C. at intervals of 10 K/min and then cooled at intervals of 10 K/min. After every interval, the conversion and the yield were measured by means of a standard FT-IR device.

It can be seen clearly in FIGS. 3 and 4 that the catalyst with Pt on cerium oxide and an iron-beta zeolite is clearly worse in particular in respect of NO oxidation. This catalyst is also somewhat poorer for CO oxidation (FIG. 1). The specific combination which is disclosed in EP 6911883 B1 is thus clearly inferior to the combination according to the invention of platinum on aluminium/silicon oxide with the iron-beta zeolite. It can furthermore be seen that the catalyst is somewhat poorer for CO and propene oxidation (FIGS. 1 and 2) when an Fe-beta zeolite with a higher iron content is used. This is probably because a blockage of the pores can play a part here.

Thus iron-doped zeolites with 0.5 - 1.5 wt.-% iron content are quite particularly preferably used.

Example 4

Determination of the Hydrocarbon Storage Properties

For the relative determination of the hydrocarbon storage properties, pulsed toluene adsorption measurements were carried out on fresh and aged samples of the catalysts. To this end, samples of the washcoat from the examples were impacted by pulses of toluene vapour in helium in a TPR/TPD device (Micromeritics Autochem II) with a mass spectrometer. The analysis of the quantity of toluene passing through the sample was carried out by evaluating the mass number 91 in the MS. Firstly, 20 pulses were emitted from a loop with 4.69 ml toluene-He vapour. The quantity of toluene still emerging with every pulse after the sample was measured via the integral. It was checked whether, after the last of the 20 pulses, the quantity of toluene remains constant and corresponds to the peak area in the bypass, i.e. no further toluene was adsorbed.

For this adsorption helium was passed through a small container with toluene temperature-controlled at 40° C. Toluene has a vapour pressure of 70 mbar. The loop had a temperature of 50° C. As this gas is flushed through the loop, the total pressure is at room pressure (1013 mbar). This showed that 12.2 µmol toluene was added per pulse. This was regarded as standard for the area of a pulse.

The toluene was then desorbed in a temperature-programmed desorption (of 40-500° C., 10° C./min) and the whole peak surface evaluated. This whole stored quantity of toluene in the sample resulted.

The toluene desorption after saturation for different ageing temperatures is given in Table 2 for Example 1 with Fe-beta 35 (0.9% Fe) and DAY zeolite.

TABLE 2

Toluene desorption of the samples with DAY and Fe-beta zeolite for different ageing temperatures

| Sample | Weighed-in quantity (g) | Desorption µmol | Desorption µmol/g |
|---|---|---|---|
| Example 1: Fe-beta 35 (09% Fe) fresh | 0.1057 | 27.30 | 258.25 |
| Example 1: Fe-beta 35 (0.9% Fe) 700° C. | 0.1009 | 23.94 | 237.29 |
| Example 1: Fe-beta 35 (0.9% Fe) 1000° C. | 0.0986 | 0.48 | 4.88 |
| Comparison example 1: DAY zeol. fresh | 0.0998 | 27.22 | 272.76 |
| Comparison example 1: DAY zeol. 700° C. | 0.1035 | 23.41 | 226.17 |
| Comparison example 1: DAY zeol. 1000° C. | 0.1017 | 0.26 | 2.56 |

It can clearly be seen that at 1000° C. the structures of both zeolites clearly collapse, but somewhat more storage capacity still remains with the Fe-beta zeolite. It can be seen that in the fresh state the DAY zeolite is somewhat better (272.76) than the Fe-beta zeolite (258.25), but after ageing at 700° C. the Fe-beta zeolite is already better, evidence of a higher thermostability of the iron-beta zeolite compared with the Y-zeolite. This property is particularly important for diesel oxidation catalysts with a downstream DPF, or in the case of a combination of DOC and DPF, because here the DOC catalyst must withstand much higher temperatures.

Summary of the Results:

It is shown that the combination of Pt on a non-cerium-containing support such as aluminium oxide or Al/Si mixed oxide or zirconium oxide and an Fe-beta zeolite offer very great advantages specifically for the new requirements applicable to DOC catalysts.

The examples listed here show that such a catalyst has much lower light-off temperatures for CO than catalysts with Pt on Ce mixed oxides. They also show a much better oxidation of NO to $NO_2$, which is now also necessary on account of the oxidation of soot in downstream soot filters.

It can also be seen that the preferred use of an Fe-beta zeolite with not too high an Fe content (0.5-1.5%) is particularly preferred, as here even the CO oxidation is also somewhat better than when using the DAY zeolite and an Fe-beta zeolite with 3.6% iron. It is to be assumed that the pore structure and size are then very favourable for the diffusion of the small CO molecule in the catalyst layer. A zeolite with a larger quantity of iron no longer contains all the iron in the zeolite, which can also be seen from the red-brown colour. Iron oxide which separates on the surface seemingly blocks pores. The use of an iron-beta zeolite with 0.9% iron is thus particularly advantageous.

The combination of platinum on an aluminium oxide or Al/Si mixed oxide with a $H^+$ or $Na^+$ zeolite is described in EP 800856 B1. An iron-exchanged zeolite is not included here. The results show that when fresh the DAY zeolite actually has a somewhat higher hydrocarbon storage capacity than the iron-beta zeolite. However, as temperature stability is more important for the DOC with downstream DPF, the results here show that here the iron-beta zeolite is more temperature-resistant than the DAY zeolite. The combination of Pt on Al/Si mixed oxide or Pt on aluminium oxide with the iron-beta zeolite is therefore also advantageous here.

The invention claimed is:

1. A coating composition for diesel oxidation catalysts or a combination of diesel oxidation catalysts and diesel particle filters, wherein the coating composition comprises:
   a mixture of a noble metal on a metal oxide, with the exception of cerium oxide, and a zeolite doped with iron, said zeolite having an iron content of 0.5-10 wt.-%, relative to the overall weight of the zeolite.

2. The coating composition according to claim 1, wherein said zeolite has an Si/Al ratio of at least 5:1.

3. The coating composition according to claim 2, wherein said zeolite doped with iron is iron-doped ZSM-5, Y, BETA or mordenite.

4. The coating composition according to claim 1, wherein said metal oxide is aluminium oxide, Al/Si mixed oxide, titanium oxide or zirconium oxide.

5. The coating composition according to claim 1, wherein the metal oxide/ iron-doped zeolite weight ratio is 10:1 to 1:1.

6. The coating composition according to claim 1, wherein said noble metal is platinum or palladium.

7. The coating composition according to claim 6, wherein said noble metal is platinum.

8. The coating composition according to claim 1, wherein the iron-doped zeolite is a beta zeolite with an $SiO_2/Al_2O_3$ ratio of from 20:1 to 150:1 and an iron content 0.5 to 1.5%.

9. The coating composition according to claim 1, wherein the iron-doped zeolite is a mixture of iron beta zeolite and iron ZSM-5 zeolite.

10. The coating composition according to claim 1, wherein the iron-doped zeolite has an iron content of 0.5-5.9 wt.-%.

11. The coating composition according to claim 1, wherein the iron-doped zeolite has an iron content of 0.6-2.0 wt.-%.

12. The coating composition according to claim 1, wherein said metal oxide is aluminium oxide, titanium oxide, zirconium oxide, or Al/Si mixed oxide in which the molar ratio of Al/Si is to 95:5 to 80:20.

13. The coating composition according to claim 1, wherein the metal oxide/ iron-doped zeolite weight ratio is 6:1 to 1:1.

14. The coating composition according to claim 1, wherein the metal oxide/ iron-doped zeolite weight ratio is 5:1 to 2:1.

15. A method of coating a catalyst, said method comprising coating a combined diesel oxidation catalyst and diesel particle filter with the coating composition according to claim 1.

16. A catalyst composition for treating the exhaust gas of diesel internal combustion engines, said composition comprising a diesel oxidation catalyst coated with the coating composition according to claim 1.

17. The catalyst composition according to claim 16, wherein said composition further comprises a diesel particle filter.

18. A method for treating the exhaust gas of diesel internal combustion engines, comprising: the
   passing said exhaust gas over a catalyst composition according to claim 16, whereby said exhaust gas is subjected to oxidation of CO and HC, reduction of $NO_x$ and elimination or reduction of particle emissions.

19. A method for treating the exhaust gas of diesel internal combustion engines, comprising:
   passing said exhaust gas according to claim 17, whereby said exhaust gas is subjected to oxidation of CO and HC, reduction of $NO_x$ and elimination or reduction of particle emissions.

20. A process for the preparation of a diesel oxidation catalyst comprising a mixture of a noble metal on a metal oxide, with the exception of cerium oxide, and a zeolite doped with iron, said zeolite having an iron content of 0.5-10 wt.-%, relative to the overall weight of the zeolite, said process comprising:
   depositing on a catalyst support a suspension containing said noble metal on a metal oxide and said zeolite doped with iron.

* * * * *